United States Patent
Lee

(10) Patent No.: US 9,792,183 B2
(45) Date of Patent: Oct. 17, 2017

(54) METHOD, APPARATUS, AND RECORDING MEDIUM FOR INTERWORKING WITH EXTERNAL TERMINAL

(71) Applicant: Samsung Electronics Co., Ltd., Suwon-si, Gyeonggi-do (KR)

(72) Inventor: Hwa-Jun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 165 days.

(21) Appl. No.: 14/467,530

(22) Filed: Aug. 25, 2014

(65) Prior Publication Data

US 2015/0067398 A1 Mar. 5, 2015

(30) Foreign Application Priority Data

Aug. 28, 2013 (KR) .................. 10-2013-0102766

(51) Int. Cl.
*G06F 11/14* (2006.01)
*H04M 1/725* (2006.01)

(52) U.S. Cl.
CPC ....... *G06F 11/1441* (2013.01); *H04M 1/7253* (2013.01); *H04M 2250/64* (2013.01)

(58) Field of Classification Search
None
See application file for complete search history.

(56) References Cited

U.S. PATENT DOCUMENTS

| 7,533,178 B2* | 5/2009 | Henniger ................ H04L 67/14 709/227 |
| 2004/0235523 A1* | 11/2004 | Schrire .......... H04M 1/274516 455/558 |
| 2006/0015562 A1 | 1/2006 | Kilian-Kehr et al. |
| 2008/0104252 A1 | 5/2008 | Henniger |
| 2008/0216125 A1 | 9/2008 | Li et al. |
| 2010/0159876 A1 | 6/2010 | Brown et al. |
| 2010/0235523 A1 | 9/2010 | Garcia et al. |
| 2012/0239817 A1* | 9/2012 | Ensing ................. G06Q 50/01 709/228 |
| 2012/0260076 A1 | 10/2012 | Liu et al. |
| 2013/0130678 A1* | 5/2013 | Zanier .................. H04W 8/065 455/433 |
| 2013/0132576 A1* | 5/2013 | Haba ................ G06F 15/17306 709/225 |
| 2013/0185368 A1 | 7/2013 | Nordstrom et al. |

FOREIGN PATENT DOCUMENTS

KR 10-2012-0119959 A 11/2012

* cited by examiner

*Primary Examiner* — Fahmida Rahman
(74) *Attorney, Agent, or Firm* — Jefferson IP Law, LLP

(57) ABSTRACT

A method for interworking with an external terminal is provided. The method includes, at a mobile terminal, displaying a screen for selecting whether or not to reset the mobile terminal, if a connection request is received from a second terminal while the mobile terminal interworks with a first terminal, at the mobile terminal, generating first backup data including information about one or more execution files corresponding to one or more functions linked to the first terminal, if resetting of the mobile terminal has been selected on the screen, and at the mobile terminal, transmitting the first backup data to the first terminal, and performing resetting.

21 Claims, 7 Drawing Sheets

METHOD, APPARATUS, AND RECORDING MEDIUM FOR INTERWORKING WITH EXTERNAL TERMINAL

CROSS-REFERENCE TO RELATED APPLICATION(S)

This application claims the benefit under 35 U.S.C. §119 (a) of a Korean patent application filed on Aug. 28, 2013 in the Korean Intellectual Property Office and assigned Serial No. 10-2013-0102766, the entire disclosure of which is hereby incorporated by reference.

TECHNICAL FIELD

The present disclosure relates to a method, apparatus, and recording medium for interworking with an external terminal such that two terminals can interwork with each other.

BACKGROUND

Terminals, such as smart phones and tablet Personal Computers (PCs), can interwork with each other through wireless communication. A terminal interworking with another terminal can share various functions with the other terminal. For example, the terminal may share various applications, specific functions, or various services (e.g., playing a movie, viewing pictures, listening to music, playing games, running the Internet, a chat service, etc.), which are provided to a user, with the other terminal.

In the related art, if one (hereinafter, referred to as a mobile terminal) of two terminals interworking with each other receives a connection request from another terminal, the mobile terminal ignores the connection request from the other terminal, or disconnects itself from the terminal to which the mobile terminal is currently connected and then connects to the other terminal. In order to connect to the other terminal, the mobile terminal should be initialized. However, many users do not know that their mobile phones should be initialized in order to connect to other terminals, without looking into a user's manual. Accordingly, many users experience difficulties in connecting their mobile terminals to other terminals, creating a need for an improved apparatus and method for interworking with an external terminal so that a user can easily connect his/her terminal interworking with a specific terminal to another terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method, apparatus, and recording medium for interworking with an external terminal so that a user can easily connect his/her terminal interworking with a specific terminal to another terminal. In other words, an aspect of the present disclosure is to provide a method, apparatus, and recording medium for enabling a user who utilizes various kinds of terminals interworking with each other to easily change a terminal with which his/her terminal will interwork, through a simple manipulation.

Another aspect of the present disclosure is to provide a method, apparatus, and recording medium for interworking with an external terminal such that a user can easily connect his/her terminal interworking with a specific terminal to another terminal. Accordingly, a user who utilizes various kinds of terminals interworking with each other may easily change a terminal with which his/her terminal will interwork, through a simple manipulation.

In accordance with an aspect of the present disclosure, a method for interworking with an external terminal is provided. The method includes displaying, at a mobile terminal, a screen for selecting whether or not to reset the mobile terminal, if a connection request is received from a second terminal while the mobile terminal interworks with a first terminal, generating, at the mobile terminal, first backup data including information about one or more execution files corresponding to one or more functions linked to the first terminal, if resetting of the mobile terminal has been selected on the screen, and transmitting, at the mobile terminal, the first backup data to the first terminal, and performing resetting.

In accordance with another aspect of the present disclosure, an apparatus for interworking with an external terminal is provided. The apparatus includes a display unit configured to display an execution image, an operating state, and a menu state of an application program, a communication module configured to transmit and receive a radio signal, and a controller configured to display a screen for selecting whether or not to reset on the display unit, if a connection request is received from a second terminal through the communication module when the apparatus interworks with a first terminal, to generate first backup data including information about one or more execution files corresponding to one or more functions linked to the first terminal, if resetting has been selected on the screen, to transmit the first backup data to the first terminal through the communication module, and to reset the apparatus.

In accordance with still another aspect of the present disclosure, a recording medium for interworking with an external terminal is provided. The recording medium includes a display unit configured to display an execution image, an operating state, and a menu state of an application program, a communication module configured to transmit and receive a radio signal, and a controller configured to display a screen for selecting whether or not to reset on the display unit, if a connection request is received from a second terminal through the communication module when the recording medium interworks with a first terminal, to generate first backup data including information about one or more execution files corresponding to one or more functions linked to the first terminal, if resetting has been selected on the screen, to transmit the first backup data to the first terminal through the communication module, and to reset the recording medium.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
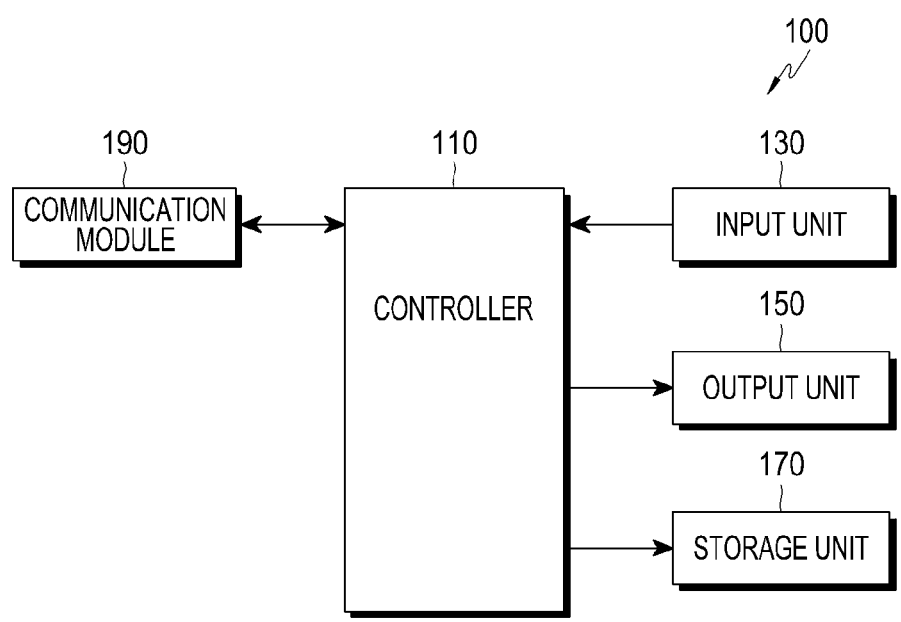
FIG. 1 is a block diagram of a mobile terminal interworking with an external terminal according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, details about a mobile terminal, a first terminal, first backup data, etc. are provided to assist in a comprehensive understanding of various embodiments of the disclosure as defined by the claims and their equivalents. Accordingly, those of ordinary skill in the art will recognize that various changes and modifications of the embodiments described herein can be made without departing from the scope and spirit of the disclosure.

In order to describe a method for interworking between terminals, according to an embodiment of the present disclosure, terminals are differentially referred to as a mobile terminal, a first terminal, and a second terminal. Each of the mobile terminal, the first terminal, and the second terminal has a wireless communication function, and may be a smart phone, a tablet Personal Computer (PC), a watch, an MP3 player, and the like. Also, the configuration of each external terminal, that is, the configuration of each of the first and second terminals may be substantially the same as that of a block diagram illustrated in FIG. 1 although it may omit a part of components illustrated in FIG. 1 or it may further include another component(s) in addition to the components illustrated in FIG. 1.

The mobile terminal can perform functions corresponding to one or more functions of an external terminal (e.g., the first or second terminal) by wirelessly connecting to the external terminal to interwork with the external terminal. The functions may include various applications or predetermined functions (e.g., playing a movie, viewing pictures, listening to music, playing games, running the Internet, a Short Message Service (SMS), E-mail, etc.) that are provided to a user. An example of an operation of performing a function corresponding to that of the external terminal may be to display, if the first terminal has received a text message when the first terminal interworks with the mobile terminal, a notification message informing that the first terminal has received a text message on the mobile terminal.

FIG. 1 is a block diagram of a mobile terminal interworking with an external terminal according to an embodiment of the present disclosure.

Referring to FIG. 1, a mobile terminal 100 may include an input unit 130, an output unit 150, a storage unit 170, a communication module 190, and a controller 110.

The input unit 130 may receive a user's manipulations. The input unit 130 may be configured with a touch screen (and a touch screen controller) which will be described later, and may include one or more buttons (not shown).

The buttons may be provided in the front, side, and/or rear part of the housing of the mobile terminal 100. The buttons may include at least one of a power/lock button (not shown) and a menu button (not shown).

The output unit 150 may include at least one of a display unit (not shown) and a speaker (not shown).

The display unit may display execution images, operating states, and menu states of various application programs. The display unit may be integrated into the touch screen.

The speaker may output sound corresponding to a function that is performed by the mobile terminal 100 according to the control of the controller 110. The speaker may be provided as at least one unit at an appropriate location (or locations) on the housing of the mobile terminal 100.

The touch screen may receive a user's manipulations, and display an execution image, an operating state, and a menu state of an application program. That is, the touch screen may provide a user with Graphic User Interfaces (GUIs) corresponding to various services (e.g., a call, data transmission, broadcasting, and photographing). The touch screen may output an analog signal corresponding to at least one touch input inputted to a GUI to the touch screen controller. The touch screen may receive at least one touch input through a user's finger or a pointing unit (e.g., a stylus pen, hereinafter, referred to as an electronic pen) such as an electronic pen. Also, the touch screen may receive a touch-and-drag input. In this case, the touch screen may transmit an analog signal corresponding to the touch-and-drag input to the touch screen controller.

The touch screen may be a resistive touch screen, a capacitive touch screen, an infrared touch screen, an acoustic wave touch screen, or an Electro Magnetic Resonance (EMR) touch screen.

In this specification, the term "touch" is not limited to a contact of a user's finger or the electronic pen to the touch screen, and may include non-contact recognition. A recognition distance in which the touch screen can recognize the user's finger or the electronic pen may depend on the performance or structure of the mobile terminal 100. For example, in order to distinguish a touch event occurring by a contact of a user's finger or the electronic pen to the touch screen from an input (e.g., a hovering event) occurring by non-contact recognition, the touch screen is configured to output different values (e.g., current values) with respect to the touch event and the hovering event. Also, the touch screen may output a value (e.g., a current value) depending on a distance between the touch screen and a space where a hovering event has occurred.

The touch screen controller may convert an analog signal received from the touch screen into a digital signal (e.g., X and Y coordinates), and transmit the digital signal to the controller 110. The controller 110 may control the touch screen using the digital signal received from the touch screen controller. For example, the controller 110 may select a shortcut icon (not shown) displayed on the touch screen or execute the shortcut icon, in response to a touch event or a hovering event. The touch screen controller may be integrated with the controller 110.

The touch screen controller may detect a value (e.g., a current value) output through the touch screen to determine a value of a distance between a space in which a hovering event has occurred and the touch screen, convert the distance value into a digital signal (e.g., Z coordinate), and provide the digital signal to the controller 110.

The touch screen may also include at least two touch panels for respectively sensing a touch or approach of a user's finger and the electronic pen so as to simultaneously receive an input by the user's finger and the electronic pen. The at least two touch panels provide different output values to the touch screen controller, and the touch screen controller recognizes the different output values received from the at least two touch panels to determine whether an input to the touch screen is an input by a user's finger or an input by the electronic pen.

The communication module 190 may include a mobile communication module (not shown), a Wireless Local Area Network (WLAN) module (not shown), a short-range communication module (not shown), and the like.

The mobile communication module enables the mobile terminal 100 to connect to an external device through mobile communication using at least one antenna (not shown), under the control of the controller 110. The mobile communication module may transmit/receive radio signals for voice calls, video calls, SMS messages, or Multimedia Message Service (MMS) messages to/from a mobile phone (not shown), a smart phone (not shown), a tablet PC (not shown), or another device (not shown), a phone number of each of which is entered or registered in the mobile terminal 100.

The WLAN module may connect to the Internet at a place in which a wireless Access Point (AP) is installed, under the control of the controller 110. The WLAN module supports the Institute of Electrical and Electronics Engineers (IEEE) 802.11x standards. The short-range communication module may be Bluetooth and may perform wireless short-range communication between terminals, under the control of the controller 110.

The communication module 190 of the mobile terminal 100 may include at least one of the mobile communication module, the WLAN module, and the short-range communication module, according to performance. For example, the communication module 190 may include a combination of a mobile communication module (not shown), a WLAN module (not shown), and a short-range communication module (not shown), according to performance.

The storage unit 170 may store signals or data that is input/output according to operations of the input unit 130, the output unit 150, and the communication module 190, under the control of the controller 110. The storage unit 170 may store control programs and applications for controlling the mobile terminal 100 or the controller 110.

In this description, the term "storage unit" includes the storage unit 170, Read Only Memory (ROM) (not shown) or Random Access Memory (RAM) (not shown) included in the controller 110, and a memory card (not shown, for example, a Secure Digital (SD) card or a memory stick) installed in the mobile terminal 100. The storage unit 170 may be a non-volatile memory, a volatile memory, a Hard Disk Drive (HDD), or a Solid State Drive (SSD).

The controller 110 may include a Central Processing Unit (CPU) (not shown), the ROM that stores control programs for controlling the mobile terminal 100, and the RAM that temporarily stores signals/data received from the outside of the mobile terminal 100 or is used as a workspace for operations performed in the mobile terminal 100. The CPU may be a single-core processor, a dual-core processor, a triple-core processor, or a quad-core processor. The CPU, the ROM, and the RAM may be connected to each other through internal buses.

The controller 110 may control the input unit 130, the output unit 150, the storage unit 170, and the communication module 190.

According to an embodiment of the present disclosure, if the mobile terminal 100 receives a connection request from the second terminal through the communication module 190 when the mobile terminal 100 interworks with the first terminal, the controller 110 may display a screen for enabling a user to select whether or not to reset on the display unit (not shown), generate, if the user selects resetting, first backup data including information about execution files corresponding to one or more functions linked to the first terminal, transmit the first backup data to the first terminal through the communication module 190, and reset the mobile terminal 100. The process of resetting the mobile terminal 100 includes initializing the mobile terminal 100 to an initial state in which the mobile terminal 100 was manufactured. After resetting the mobile terminal 100, the controller 100 may interwork with the second terminal.

Figure 2:
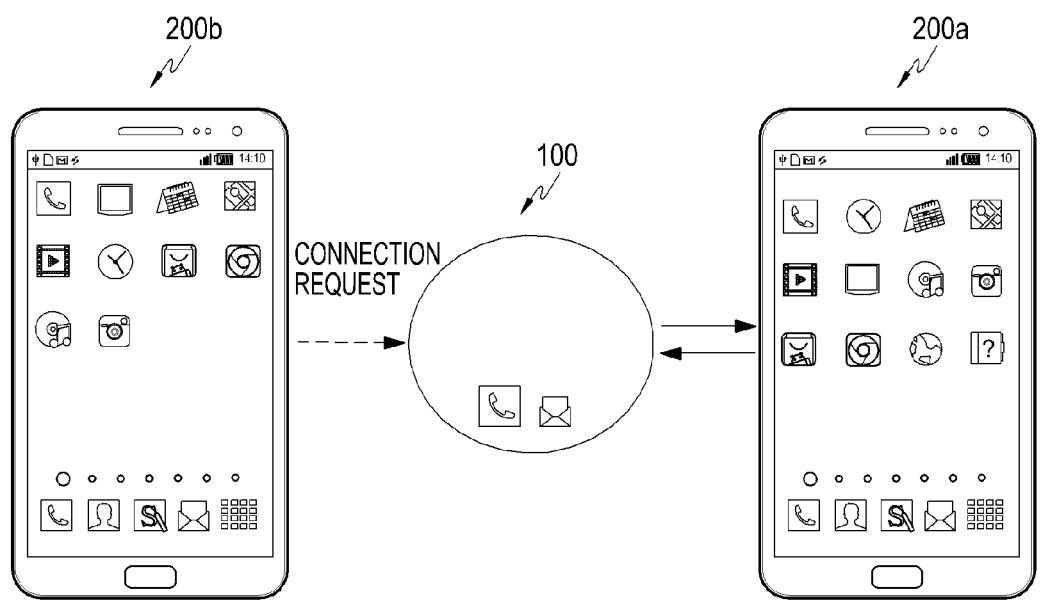
FIG. 2 illustrates a method for interworking with an external terminal according to an embodiment of the present disclosure.
Figure 3:
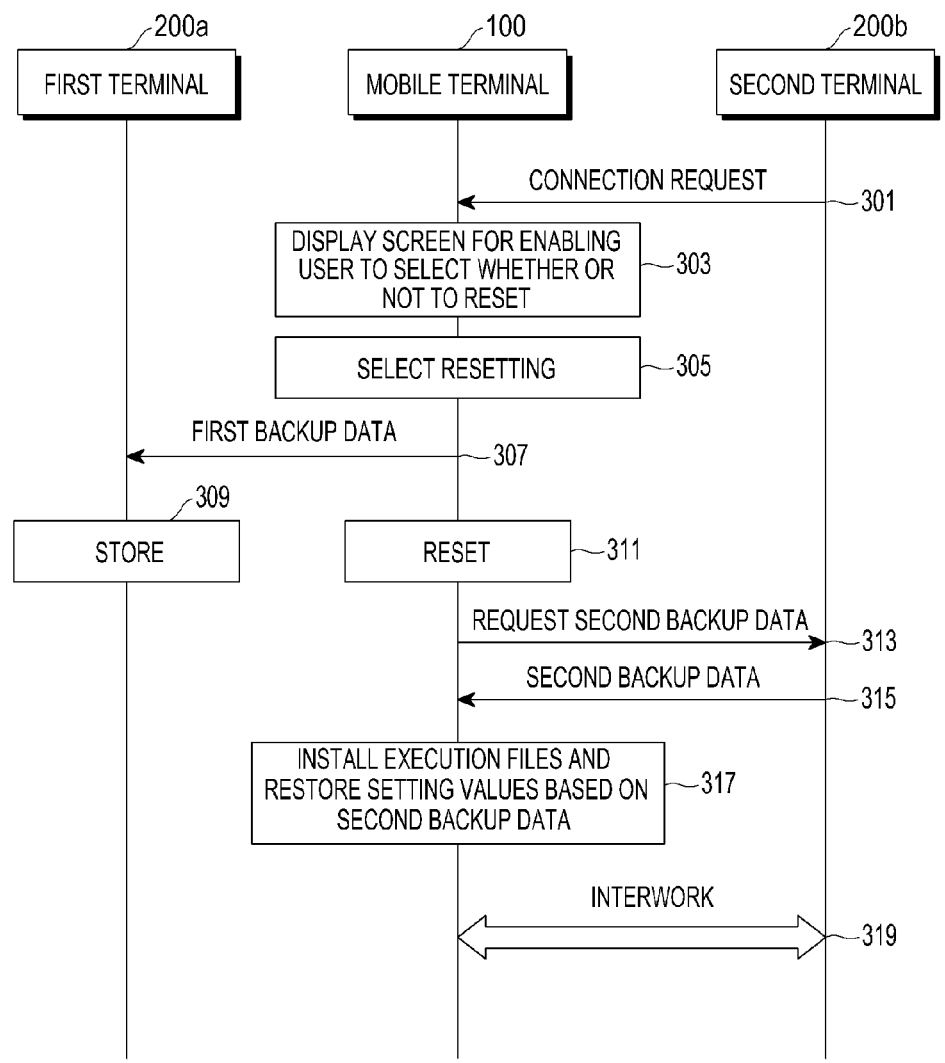
FIG. 3 is a flowchart illustrating a method for interworking with an external terminal according to an embodiment of the present disclosure.

FIG. 2 illustrates a method for interworking with an external terminal according to an embodiment of the present disclosure, and FIG. 3 is a flowchart illustrating a method for interworking with an external terminal, according to an embodiment of the present disclosure.

Referring to FIGS. 2 and 3, there is provided a method in which a mobile terminal 100 operates if the mobile terminal 100 receives a connection request from a second terminal 200b when the mobile terminal 100 interworks with a first terminal 200a. More specifically, if the mobile terminal 100 receives a connection request from the second terminal 200b, the mobile terminal 100 may display a screen for enabling a user to select whether or not to reset in order to initialize the mobile terminal 100 to an initial state in which the mobile terminal 100 was manufactured, transmit backup data to the first terminal 200a if the user selects resetting, and perform the resetting. If the second terminal 200b stores backup data, the mobile terminal 100 may install execution files based on the backup data, restore setting values of the execution files, and interwork with the second terminal 200b. If the second terminal 200b stores no backup data, the mobile terminal 100 may interwork with the second terminal 200b.

When the mobile terminal 100 interworks with the first terminal 200a, execution files corresponding to one or more functions that are executed on the first terminal 200a may have already been installed in the mobile terminal 100. For example, as illustrated in FIG. 2, functions that are executed on the first terminal 200a may include a plurality of applications (hereinafter, referred to as master applications), such as a message service, a scheduler, and a call, and applications (hereinafter, referred to as mini applications) corresponding to a part (e.g., a message master application and a call master application) of the master applications may have already been installed in the mobile terminal 100. Each mini application may perform a part of functions of the corresponding master application. For example, if a message is received through the message master application of the first terminal 200a, a message mini application of the mobile terminal 100 may perform a notification function informing that a message has been received by the first terminal 200a.

Referring to FIG. 3, in operation 301, the second terminal 200b may send a connection request signal for requesting a connection to the mobile terminal 100, to the mobile terminal 100. In operation 303, if the mobile terminal 100 receives the connection request signal from the second terminal 200b, the mobile terminal 100 may display a screen for enabling a user to select whether or not to reset the mobile terminal 100 for initialization. Resetting the mobile terminal 100 for initialization may include initializing the mobile terminal 100 to an initial state in which the mobile terminal 100 was manufactured. In operation 305, if the user selects resetting on the screen displayed on the mobile terminal 100 through a predetermined manipulation, the process may proceed to operation 307. In operation 307, the mobile terminal 100 may transmit first backup data to the first terminal 200a. The first backup data may include information about execution files corresponding to one or more functions linked to the first terminal 200a. The information about the execution files may include at least one of a list of one or more execution files installed in the mobile terminal 100, and setting values determined by generating, in the form of a file, setting information that is related to execution states of the execution files at a time when resetting has been selected. For example, when the mobile terminal 100 interworks with the first terminal 200a, the information about the execution files may include at least one of a list of execution files of mini applications corresponding to one or more master applications of the first terminal 200a, a list of execution files of each mini application, and setting values determined by generating, in the form of a file, setting information that is related to execution states of the mini applications at a time when resetting has been selected. The setting values are used to restore the current execution states of the mini applications when the first terminal 200a is again connected to the mobile terminal 100 to interwork with the mobile terminal 100. In operation 309, the first terminal 200a may store the received first backup data. The first backup data stored in the first terminal 200a enables the first terminal 200a to restore mini applications installed and used in the mobile terminal 100 and to restore setting values set in the respective mini applications, based on the list of the execution files of the first backup data and the setting values of the execution files, when the first terminal 200a is again connected to and interworks with the mobile terminal 100.

In operation 311, the mobile terminal 100 may perform resetting. The resetting of the mobile terminal 100 is aimed at connecting to another external terminal (that is, the second terminal 200b). In order for the mobile terminal 100 to be used as an auxiliary device having a part of functions of the second terminal 200b by interworking with the second terminal 200b, mini applications respectively corresponding to master applications installed in the second terminal 200b need to have been installed in the mobile terminal 100. If the second terminal 200b connects to the mobile terminal 100 interworking with the first terminal 200a when the mini applications corresponding to the master applications of the second terminal 200b have already been installed in the mobile terminal 100, the mobile terminal 100 needs to be reset since the master applications of the second terminal 200b have to be synchronized with the corresponding mini applications of the mobile terminal 100. In operation 313, the mobile terminal 100 may transmit a second backup data request signal to the second terminal 200b. The second backup data includes information about execution files corresponding to one or more functions of the second terminal 200b. The information about the execution files corresponding to the one or more functions of the second terminal 200b may include at least one of a list of information about the execution files corresponding to the one or more functions of the second terminal 200b, and setting values determined by generating, in the form of a file, setting information about the execution files corresponding to the one or more functions of the second terminal 200b. The second backup data may have been stored in the second terminal 200b when the second terminal 200b has been disconnected from the mobile terminal 100 after the second terminal 200 has connected to the mobile terminal 100 to interwork with the mobile terminal 100, like the first backup data. In operation 315, the second terminal 200b may transmit the second backup data to the mobile terminal 100 in respond to the second backup data request signal. In operation 317, the mobile terminal 100 may install the individual execution files and restore setting values of the individual execution files, based on the second backup data received from the second terminal 200b. In operation 319, the mobile terminal 100 may interwork with the second terminal 200b.

Figure 4:
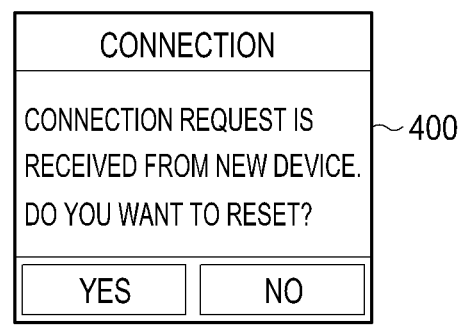
FIG. 4 shows an example of a screen for enabling a user to select whether to reset, in a method for interworking with an external terminal according to an embodiment of the present disclosure.
Figure 5A:
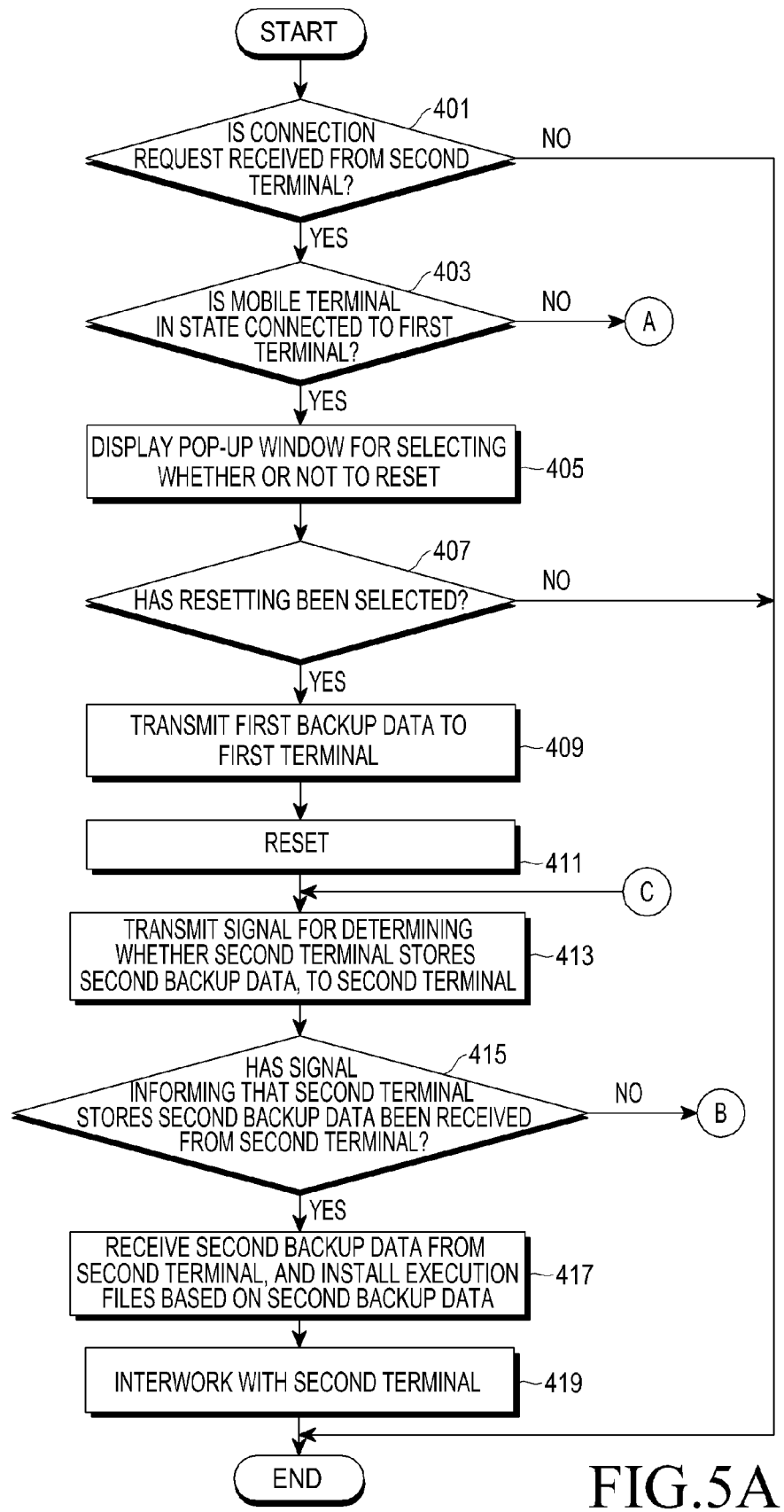
FIGS. 5A, 5B, and 5C are flowcharts illustrating a method for interworking with an external terminal according to an embodiment of the present disclosure.
Figure 5B:
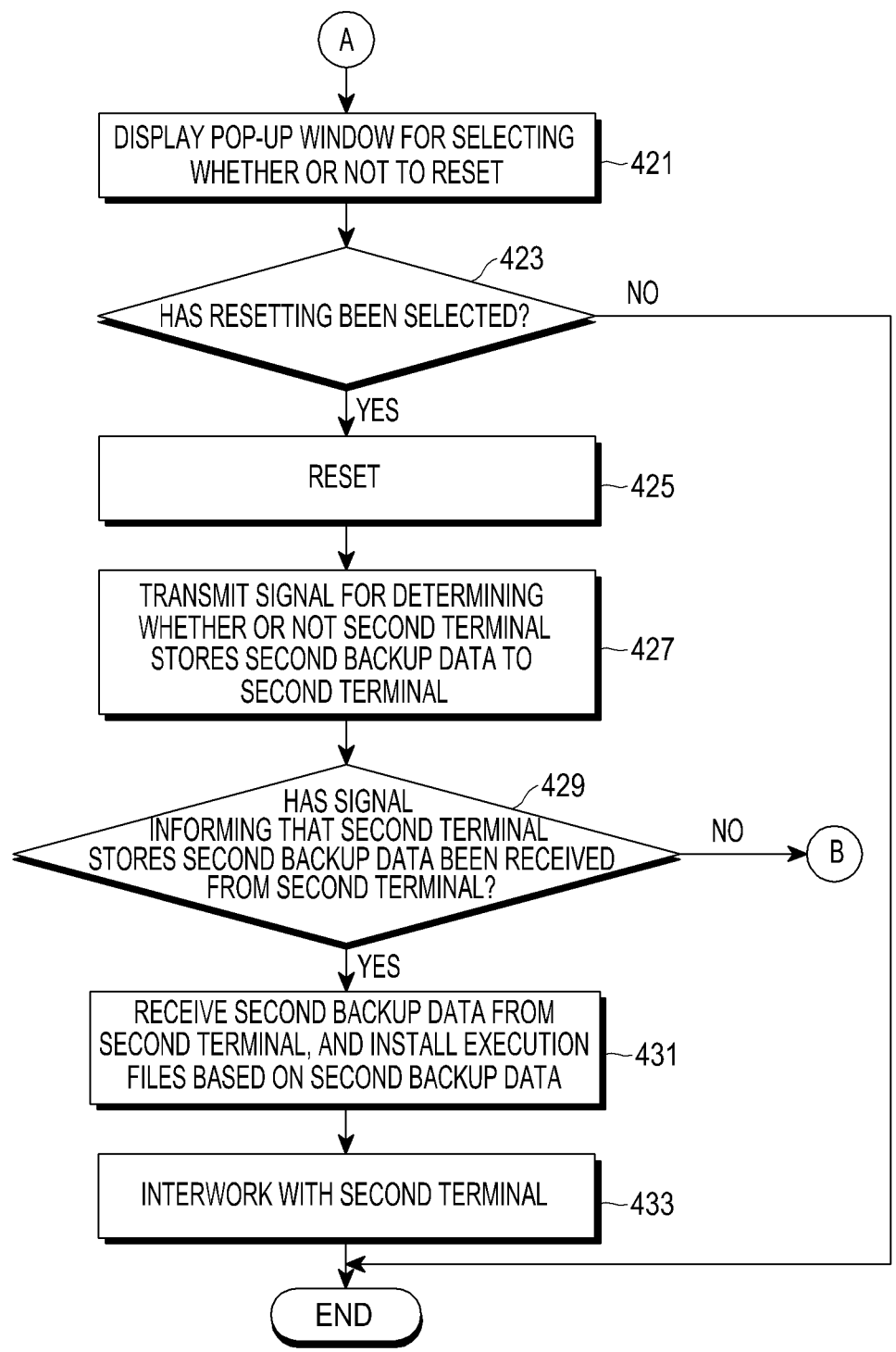
Figure 5C:
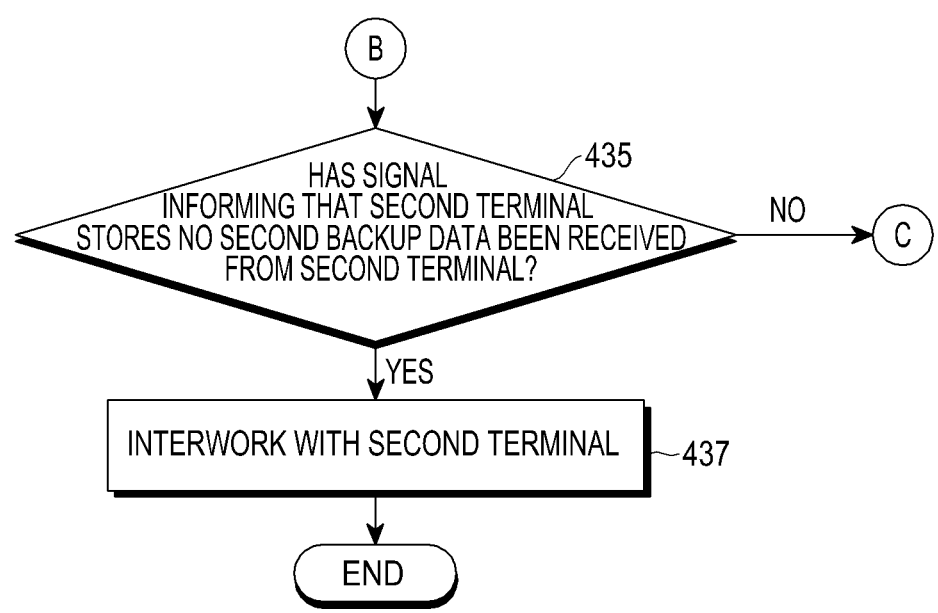

FIG. 4 shows an example of a screen for enabling a user to select whether to reset, in a method for interworking with an external terminal according to an embodiment of the present disclosure. FIGS. 5A, 5B, and 5C are flowcharts illustrating a method for interworking with an external terminal according to an embodiment of the present disclosure.

Referring to FIGS. 4, 5A, 5B, and 5C, if a mobile terminal receives a connection request from an external terminal (hereinafter, referred to as a second terminal), the mobile terminal may determine whether the mobile terminal is in a state connected to another terminal (hereinafter, referred to as a first terminal) except for the second terminal. If the mobile terminal is in a state connected to the first terminal, the mobile terminal may display a pop-up window for enabling a user to select whether or not to reset. If the user selects resetting on the pop-up window, the mobile terminal may transmit back-up data (hereinafter, referred to as first backup data) to the first terminal and may be reset to an initial state. Thereafter, the mobile terminal may determine whether the second terminal stores backup data (hereinafter, referred to as second backup data). If the mobile terminal determines that the second terminal stores second backup data, the mobile terminal may receive the second backup data from the second terminal, and restore one or more execution files based on the second backup data to interwork with the second terminal. If the mobile terminal determines that the second terminal stores no second backup data, the mobile terminal may interwork with the second terminal. If the mobile terminal determines that the mobile terminal is not in a state connected to the first terminal, the mobile terminal may perform the other operations, except for the operation of transmitting the first backup data to the first terminal, among the operations described above.

In operation 401, the mobile terminal may determine whether a connection request is received from the second terminal. If the mobile terminal determines that a connection request has been received from the second terminal, the process may proceed to operation 403. If the mobile terminal determines that no connection request has been received from the second terminal, the process may terminate. In operation 403, the mobile terminal may determine whether the mobile terminal is in a state connected to the first terminal. If the mobile terminal determines that the mobile terminal is in a state connected to the first terminal, the process may proceed to operation 405. If the mobile terminal determines that the mobile terminal is not in a state connected to the first terminal, the process may proceed to operation 421. In operation 405, the mobile terminal may display a pop-up window for enabling a user to select whether or not to reset for initialization. As an example, the mobile terminal may display a popup window 400 as illustrated in FIG. 4. In operation 407, the mobile terminal may determine whether or not resetting has been selected on the pop-up window. If the mobile terminal determines that resetting has been selected, the process may proceed to operation 409. If the mobile terminal determines that resetting has been not selected, the process may terminate. In operation 409, the mobile terminal may transmit first backup data to the first terminal, and may perform resetting to be initialized in operation 411. In operation 413, the mobile terminal may transmit a signal for determining whether the second terminal stores second backup data, to the second terminal. In operation 415, the mobile terminal may determine whether a signal informing that the second terminal stores second backup data is received from the second terminal. If the mobile terminal determines that a signal informing that the second terminal stores second backup data has been received from the second terminal, the process may proceed to operation 417, and if the mobile terminal determines that no signal informing that the second terminal stores second backup data has been received from the second terminal, the process may proceed to operation 435. In operation 417, the mobile terminal may receive the second backup data from the second terminal, and install one or more execution files based on the second backup data. At this time, setting values of the installed execution files may also be restored, and accordingly, the installed execution files may be executed in the same states as when the second backup data has been generated and stored. In operation 419, the mobile terminal may interwork with the second terminal.

In operation 421, a pop-up window for enabling a user to select whether or not to reset for initialization according to the user's manipulation may be displayed. Again, the mobile terminal may display the popup window 400 as illustrated in FIG. 4 as an example. In operation 423, the mobile terminal may determine whether or not resetting has been selected. If the mobile terminal determines that resetting has been selected, the process may proceed to operation 425. If the mobile terminal determines that resetting has been not selected, the process may terminate. In operation 425, the mobile terminal may perform resetting to be initialized. In operation 427, the mobile terminal may transmit a signal for determining whether or not the second terminal stores second backup data, to the second terminal. In operation 429, the mobile terminal may determine whether a signal informing that the second terminal stores second backup data is received from the second terminal. If the mobile terminal determines that a signal informing that the second terminal stores second backup data has been received from the second terminal, the process may proceed to operation 431. If the mobile terminal determines that no signal informing that the second terminal stores second backup data has been received from the second terminal, the process may proceed to operation 435. In operation 431, the mobile terminal may receive the second backup data from the second terminal, and install one or more execution files based on the second backup data. In operation 433, the mobile terminal may interwork with the second terminal.

In operation 435, the mobile terminal may determine whether a signal informing that the second terminal stores no second backup data is received from the second terminal. If the mobile terminal determines that a signal informing that the second terminal stores no second backup data has been received from the second terminal, the process may proceed to operation 437, and if the mobile terminal determines that no signal informing that the second terminal stores no second backup data has been received from the second terminal, the process may return to operation 413. In operation 437, the mobile terminal may interwork with the second terminal.

A method for interworking with an external terminal, according to an embodiment of the present disclosure, has been described above. However, various changes and modifications of the embodiments described herein can be made. For example, all or a part of operations described in this specification may be simultaneously performed in parallel, a part of the operations may be omitted, or other operations may be additionally performed.

For example, mini applications corresponding to a part of the plurality of master applications are installed in the mobile terminal according to the above description. However, mini applications corresponding to all of the master applications, instead of the part of the master applications, may be installed in the mobile terminal.

Also, each mini application performs a part of functions of the corresponding master application according to the above description. However, each mini application may perform only a notification function of the master application or may perform the same functions as the master application.

It will be appreciated that embodiments of the present disclosure can be realized in the form of hardware, software, or a combination of hardware and software. Any such software may be stored in non-volatile storage such as, for example, a storage device like a ROM, whether erasable or rewritable or not, in memory such as, for example, RAM, memory chips, device or integrated circuits, or in an optically or magnetically writable, machine (e.g., a computer)-readable medium such as, for example, a Compact Disk (CD), Digital Versatile Disk (DVD), magnetic disk or magnetic tape or the like. The memory that can be included in the mobile terminal is an example of a machine-readable storage medium suitable to store a program or programs including instructions for implementing embodiments of the present disclosure. Accordingly, embodiments of the present disclosure include a program comprising code for implementing an apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

As described above, by using a method, apparatus, and recording medium for interworking with an external terminal, according to embodiments of the present disclosure, a user may easily connect his/her terminal interworking with a specific terminal to another terminal. In other words, users who utilize various kinds of terminals interworking with each other may easily change terminals with which their terminals will interwork, through a simple manipulation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for interworking with an external terminal, the method comprising:
   displaying, at a mobile terminal, a screen for selecting whether or not to reset the mobile terminal for initialization, if a connection request is received from a second terminal while the mobile terminal interworks with a first terminal;
   generating, at the mobile terminal, first backup data including information about one or more execution files corresponding to one or more functions belonging to one or more applications linked to the first terminal to restore setting values set in the one or more applications for reconnecting to the first terminal, if resetting of the mobile terminal has been selected on the screen; and
   transmitting, at the mobile terminal, the first backup data to the first terminal, and performing resetting of the mobile terminal.

2. The method of claim 1, further comprising interworking with the second terminal after the performing of the resetting.

3. The method of claim 1,
   wherein the information about the one or more execution files corresponding to the one or more functions linked to the first terminal includes at least one of a list of one or more execution files installed in the mobile terminal, and
   wherein the setting values are determined by generating, in a form of a file, setting information that is related to execution states of the execution files at a time when the resetting is selected.

4. The method of claim 1, wherein the resetting comprises initializing the mobile terminal to an initial state in which the mobile terminal was manufactured.

5. The method of claim 2, wherein the interworking with the second terminal comprises:
   if the second terminal stores second backup data including information about one or more execution files corresponding to one or more functions of the second terminal, requesting the second terminal to transmit the second backup data;
   if the second backup data is received from the second terminal, installing the execution files based on the second backup data; and
   interworking with the second terminal after installing the execution files.

6. The method of claim 5, further comprising interworking with the second terminal if the second terminal stores no second backup data.

7. The method of claim 5,
   wherein the information about the one or more execution files corresponding to the one or more functions of the second terminal includes at least one of a list of the one or more execution files corresponding to the one or more functions of the second terminal, and the setting values are determined by generating, in a form of a file, setting information of the one or more execution files corresponding to the one or more functions of the second terminal, and
   wherein the installing of the execution files comprises applying the setting values of the execution files to install the execution files.

8. An apparatus for interworking with an external terminal, the apparatus comprising:
   a memory configured to store instructions therein;
   a display configured to display an execution image, an operating state, and a menu state of an application program;
   a transceiver configured to transmit and receive a radio signal; and
   at least one processor configured, upon execution of the instructions, to:
     display a screen for selecting whether or not to reset on the display for initialization,
     if a connection request is received from a second terminal through the transceiver when the apparatus interworks with a first terminal, generate first backup data including information about one or more execution files corresponding to one or more functions belonging to one or more applications linked to the first terminal to restore setting values set in the one or more applications for reconnecting to the first terminal, and
     if resetting has been selected on the screen:
       transmit the first backup data to the first terminal through the transceiver, and
       reset the apparatus.

9. The apparatus of claim 8, wherein the at least one processor is further configured to interwork with the second terminal after the apparatus is reset.

10. The apparatus of claim 8,
    wherein the information about the one or more execution files corresponding to the one or more functions linked to the first terminal includes a list of one or more execution files installed in the apparatus, and
    wherein the at least one processor is further configured to set values determined by generating, in the form of a file, setting information that is related to execution states of the execution files at a time when the resetting has been selected.

11. The apparatus of claim 8, wherein the resetting of the apparatus comprises initializing the apparatus to an initial state in which the apparatus was manufactured.

12. The apparatus of claim 9, wherein the at least one processor is further configured to:
    request the second terminal to transmit second backup data through the transceiver, if the second terminal stores second backup data including information about one or more execution files corresponding to one or more functions of the second terminal,
    install the execution files based on the second backup data if the second backup data is received from the second terminal through the transceiver, and
    interwork with the second terminal.

13. The apparatus of claim 12, wherein the at least one processor is further configured to, if the second terminal stores no second backup data, interwork with the second terminal.

14. The apparatus of claim 12,
    wherein the information about the one or more execution files corresponding to the one or more functions of the second terminal includes at least one of a list of one or more execution files, and the setting values are determined by generating, in the form of a file, setting information of the execution files, and wherein the at least one processor is further configured to apply the setting values of the execution files to install the execution files.

15. A non-transitory recording medium for interworking with an external terminal, the non-transitory recording medium comprising instructions that, when executed, configure at least one processor to implement:

displaying an execution image, an operating state, and a menu state of an application program;

transmitting and receiving a radio signal;

displaying a screen for selecting whether or not to reset a mobile terminal for initialization;

if a connection request is received from a second terminal when the mobile terminal interworks with a first terminal, generating first backup data including information about one or more execution files corresponding to one or more functions belonging to one or more applications linked to the first terminal to restore setting values set in the one or more applications for reconnecting to the first terminal; and if an instruction for resetting has been selected on the screen:

transmitting the first backup data to the first terminal, and resetting the mobile terminal.

16. The non-transitory recording medium of claim 15, wherein the instructions further comprises interworking with the second terminal after the resetting of the mobile terminal.

17. The non-transitory recording medium of claim 15, wherein the information about the one or more execution files corresponding to the one or more functions linked to the first terminal includes at least one of a list of one or more execution files installed in the mobile terminal, and wherein the at least one processor is further configured to set values determined by generating, in the form of a file, setting information that is related to execution states of the execution files at a time when the instruction for resetting has been selected.

18. The non-transitory recording medium of claim 15, wherein the resetting of the mobile terminal comprises initializing the mobile terminal to an initial state in which the mobile terminal was manufactured.

19. The non-transitory recording medium of claim 16, wherein the instructions further comprises:

requesting the second terminal to transmit second backup data through the transceiver, if the second terminal stores second backup data including information about one or more execution files corresponding to one or more functions of the second terminal, installing the execution files based on the second backup data if the second backup data is received from the second terminal through the transceiver, and interworking with the second terminal.

20. The non-transitory recording medium of claim 19, wherein the instructions further comprises, if the second terminal stores no second backup data, interworking with the second terminal.

21. The non-transitory recording medium of claim 19, wherein the information about the one or more execution files corresponding to the one or more functions of the second terminal includes at least one of a list of one or more execution files, and wherein the instructions further comprise:

determining the setting values by generating, in the form of a file, setting information of the execution files, and applying the setting values of the execution files to install the execution files.

* * * * *